Figure 1:
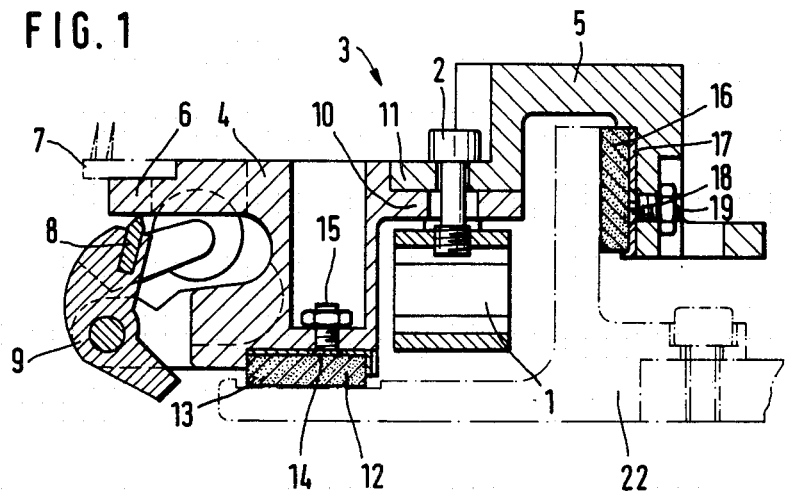

United States Patent [19]

Cramer

[11] Patent Number: 4,558,496
[45] Date of Patent: Dec. 17, 1985

[54] COMBINED PIN AND NIPPER CHAIN

[75] Inventor: Hans Cramer, Haaren, Fed. Rep. of Germany

[73] Assignee: H. Krantz GmbH & Co., Aachen, Fed. Rep. of Germany

[21] Appl. No.: 660,744

[22] Filed: Oct. 15, 1984

[30] Foreign Application Priority Data

Oct. 28, 1983 [DE] Fed. Rep. of Germany ....... 3339150

[51] Int. Cl.$^4$ ............................................. D06C 3/04
[52] U.S. Cl. .......................................... 26/95; 26/79
[58] Field of Search .................. 26/89, 93, 94, 95, 96, 26/79

[56] References Cited

U.S. PATENT DOCUMENTS 2,719,349 10/1955 Laurie ..................................... 26/96

FOREIGN PATENT DOCUMENTS

| 929723 | 7/1955 | Fed. Rep. of Germany | 26/95 |
| 1066983 | 10/1959 | Fed. Rep. of Germany | 26/79 |
| 2317813 | 10/1974 | Fed. Rep. of Germany | 26/96 |
| 2711643 | 9/1978 | Fed. Rep. of Germany | 26/93 |
| 2808892 | 9/1979 | Fed. Rep. of Germany | 26/95 |
| 2028392 | 3/1980 | United Kingdom | 26/95 |

*Primary Examiner*—Robert R. Mackey
*Attorney, Agent, or Firm*—Arthur B. Colvin

[57] ABSTRACT

The pin-nipper chain consists of holders detachably secured on links and is composed of two holder parts of U-shaped cross section. On the underside of one of the holder parts a slider is detachably fastened in a sheet-metal part. On an inner side of the other holder part a slider is enclosed, likewise detachably, also in a sheet-metal part. The other holder part is exchangeable for a holder part which is provided, instead of the slider, with a vertical axle on which a ball bearing is arranged.

2 Claims, 7 Drawing Figures

COMBINED PIN AND NIPPER CHAIN

The invention relates to a combined pin and nipper chain consisting of holders, detachably fastened to links, for a fixed pin strip and a pivotable nipper for each, which nipper can be pressed with a nipper knife against the underside of a projection of the holder carrying the pin strip.

A link for such chains is known from German Utility Model DE-GM No. 6811684. Due to the fixed pin strip it has the advantage of a low structural height, so that in tenters in which such chains are employed, the spacing of the nozzles which apply treatment medium on the cloth web to be treated in the tenter can be reduced, thereby improving the efficiency.

The known link, designed as a rolling link, can, however, not be transformed into a sliding link without considerable modification. Besides, exchanging worn parts of the known link requires considerable cost of assembly, necessitating, as a rule, slackening or even interrupting the chain.

It is the object of the invention to improve a chain of the initially described kind in such a way that, while keeping the structural height low, in particular all link parts subject to wear are exchangeable in a simple manner without having to slacken or even interrupt the chain.

Proceeding from the initially described chain, the invention proposes for the solution of the problem posed, that the holder consists of two holder parts of U-shaped cross section which overlap by lateral projections and have bores aligned in the overlap region to receive bolts by which the holder parts are detachably connected together and screwable to the respective link.

By thus dividing the holder into two holder parts, which are attached to the link by one bolt only, it is possible to remove and replace the entire holder or one holder part by simple unscrewing of the bolt from the link, allowing a holder part designed for a roller chain to be replaced by a holder part designed for a sliding chain without requiring both holder parts to be replaced for this transformation of the chain.

According to a variant of the invention, on a horizontal underside of the holder carrying the fixed pin strip and the pivotable nipper, as well as on a vertical inner side of the holder part offset to the latter, a slider for each is detachably fastened which is enclosed by a sheetmetal part which is connected with the respective holder part by a screw with a head non-rotationally recessed in the sheetmetal part.

The design according to the invention makes it possible to exchange sliders subject to wear in a particularly simple manner without separating the holder into the two holder parts. All that is necessary is to unscrew the nuts of the screws whose heads are non-rotationally recessed in the sheetmetal parts, so that the sheetmetal parts with the sliders are exposed and the sliders can then be detached from the sheetmetal parts, this being further facilitated if the sheetmetal parts embrace the sliders on three sides only, while a recessed arrangement of the sheetmetal parts with the sliders in the respective holder part completes the fixation of the sliders in the installed state. Preferably, the screws which fasten the sheetmetal parts to the holder part are arranged eccentrically to the sliders, so that side-reversed mounting of the sliders is ruled out.

According to an especially advantageous form of the invention, the holder part, equipped with a slider on a vertical inner side, is exchangeable for a holder which is equipped with a ball bearing arranged on a vertical axle.

By this design according to the invention, the transformation of a sliding chain into a roller chain is reduced to the especially simple exchange of this holder part.

Figure 2:
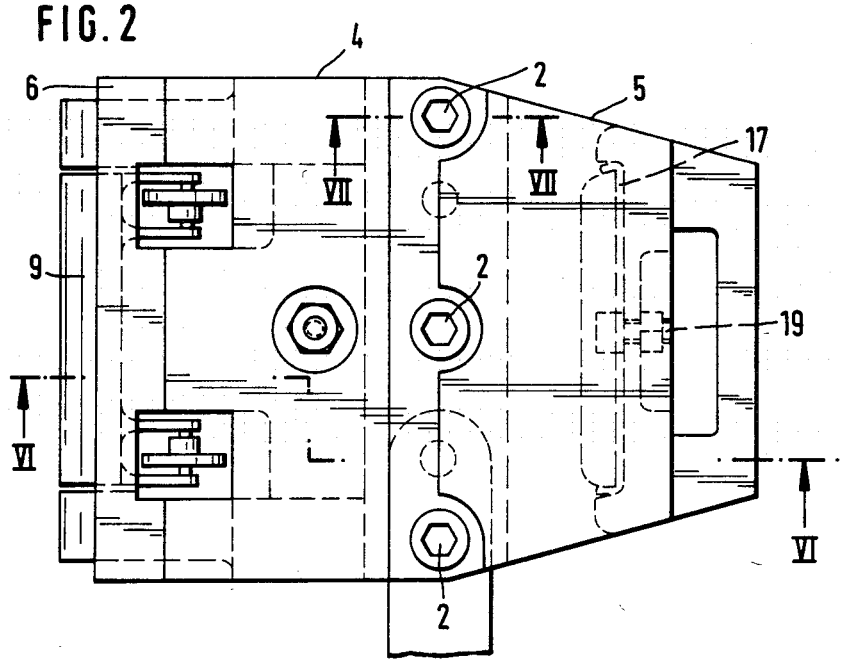
Figure 3:
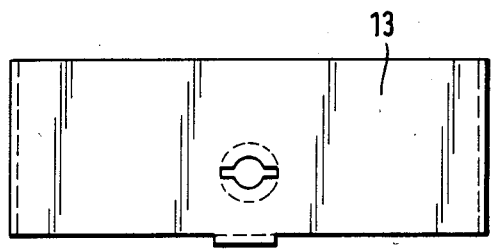
Figure 4:
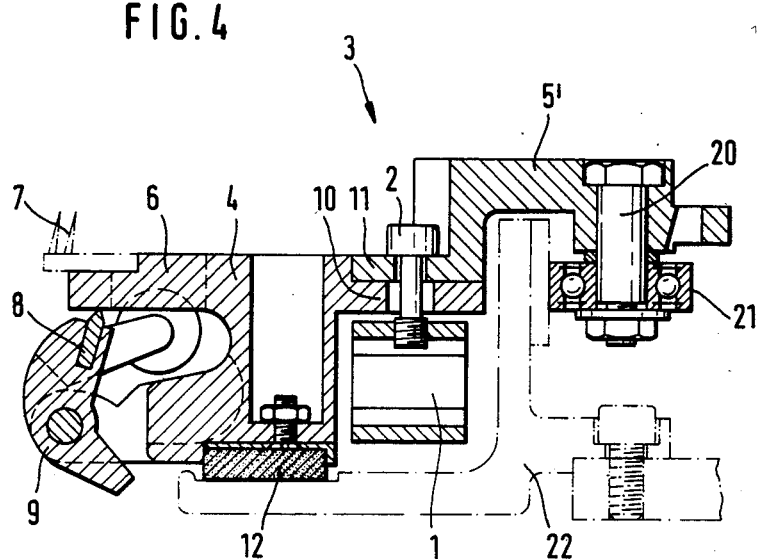
Figure 5:
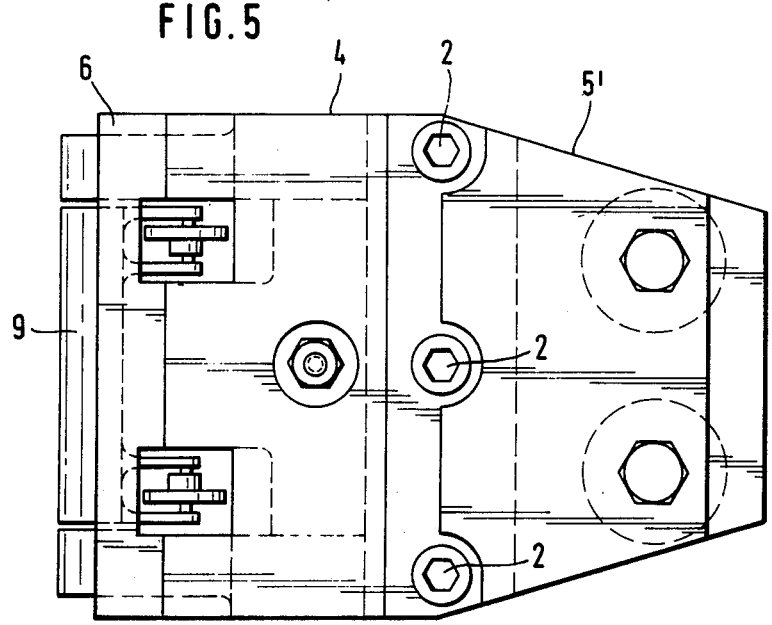
Figure 6:
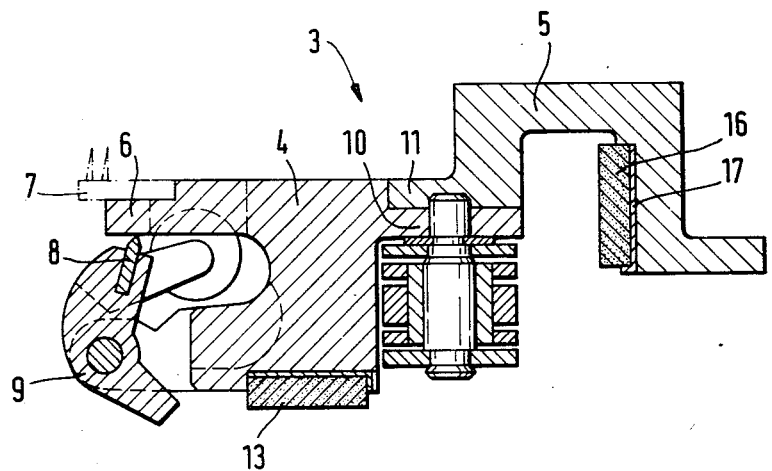
Figure 7:
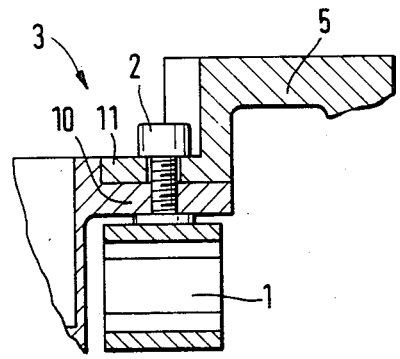

Various embodiments for chain links of a pin-nipper chain according to the invention are illustrated in the drawing, in which:

FIG. 1 shows a transverse section through a link of a sliding chain;

FIG. 2, a top view of the link according to FIG. 1;

FIG. 3, a sheetmetal part for enclosing a slider, in plan;

FIG. 4, a transverse section of a link according to FIG. 1, but for a chain designed as a roller chain;

FIG. 5, a top view onto the link according to FIG. 4;

FIG. 6, a transverse sectional view of a further embodiment of the invention;

FIG. 7, a section along line VII—VII of FIG. 2.

As shown in FIG. 1, a holder 3, which is composed of two holder parts 4 and 5 of U-shaped cross section, is attached on a link 1 by means of bolts 2. On a projection 6 of holder part 4 is mounted a pin strip 7 shown in dash-dot lines, while a knife 8 of a nipper 9 pivotably mounted on holder part 4 can be pressed against the underside of projection 6.

A projection 10 opposite the projection 6 of holder part 4 is overlapped by a projection 11 of holder part 5, so that by two outer bolts 2 passed through coaxial bores in the projections 10 and 11 the two holder parts 4 and 5 are detachably joined together, and by a central third bolt 2 the holder parts 4 and 5 are detachably secured on link 1 (FIG. 7).

On a horizontal underside of holder part 4, a slider 12 is mounted which is enclosed by a sheetmetal part 13 (FIG. 3). The head 14 of a screw 15 which detachably connects the sheetmetal part 13 with the holder part 4 is non-rotationally embedded eccentrically in sheetmetal part 13. In like manner, there is embedded on a vertical inner side of holder part 5, a slider 16 which is enclosed by a sheetmetal part 17. Also in sheetmetal part 17, the head 18 of a screw 19 is non-rotationally fitted, which screw detachably fastens the sheetmetal part 17 to the holder part 5. As FIGS. 2 and 3 indicate, the sliders 12,16 are enclosed by the sheetmetal parts 13,17 on three sides only, while the fourth side of the sliders 12,16 is held in position by the holder parts 4 and 5 directly due to the recessed arrangement of the sliders therein.

Instead of a slider 16, in the embodiment according to FIG. 4, the holder part 5' is equipped with a vertically oriented axle 20 on which a ball bearing 21 is arranged. The sliders 12 and 16 slide or, respectively, the ball bearing 21 rolls over members of an angular guide rail 22 shown in dash-dot lines. FIG. 6 depicts a further embodiment of the invention in which like parts have been given like reference numerals. In FIG. 6, a holder 3 is composed of two holder parts 4 and 5. Holder part 4 includes a projection 6 on which is mounted a pin strip 7. A knife 8 of a nipper 9 is pivotally mounted on holder part 4. A projection 10 of holder part 4 is overlapped by a projection 11 of holder part 5. On a horizontal underside of holder part 4, a slider 13 is mounted which is enclosed by a sheet metal part, while, embedded on a vertical inner side of holder part 5 there is a slider 16 which is enclosed by a sheet metal part 17.

Having thus described the invention and illustrated its use, what I claim as new and desire to secure by Letters Patent in the United States is:

1. Combined pin and nipper chain comprising a link forming part of a link chain, a pair of holders detachably fastened on an associated link, one of said holders having a projection carrying a fixed pin strip, said holder also mounting a pivotable nipper carrying a nipper knife which nipper knife can be pressed against the underside of said projection of the holder, characterized in that each of said holders is of U-shaped cross section and each has a lateral projection which overlap and have bores aligned in the overlap region to receive bolts by which the holder parts are detachably connected together and screwable to the respective link.

2. A chain according to claim 1, characterized in that, on an horizontal underside of the holder part carrying the fixed pin strip and the pivotable nipper, as well as on a vertical inner side of the other holder part, a slider for each is detachably fastened which is enclosed by a sheetmetal part which is connected with the respective holder part by a screw with a head non-rotationally recessed in the sheetmetal part.

* * * * *